(12) United States Patent
Zeighami et al.

(10) Patent No.: US 7,011,144 B2
(45) Date of Patent: Mar. 14, 2006

(54) SYSTEM AND METHOD FOR COOLING ELECTRONIC ASSEMBLIES

(75) Inventors: Roy M. Zeighami, McKinney, TX (US); Christian L. Belady, McKinney, TX (US); Glen Edwards, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/814,681

(22) Filed: Mar. 31, 2004

(65) Prior Publication Data

US 2005/0224214 A1    Oct. 13, 2005

(51) Int. Cl.
*F28D 15/00*    (2006.01)

(52) U.S. Cl. ............... 165/104.21; 165/104.33; 165/80.4; 361/697; 361/704; 361/700; 174/15.2; 257/714

(58) Field of Classification Search ............... 165/80.3, 165/185, 104.33, 104.26, 104.19, 361, 174; 361/699, 700; 174/15.2; 257/714–716
See application file for complete search history.

(56) References Cited

U.S. PATENT DOCUMENTS

| | | | | |
|---|---|---|---|---|
| 5,793,611 A | * | 8/1998 | Nakazato et al. | 361/704 |
| 5,959,837 A | * | 9/1999 | Yu | 361/697 |
| 6,102,110 A | * | 8/2000 | Julien et al. | 165/104.33 |
| 6,394,175 B1 | * | 5/2002 | Chen et al. | 165/80.3 |
| 6,625,021 B1 | * | 9/2003 | Lofland et al. | 361/697 |
| 6,651,733 B1 | * | 11/2003 | Horng et al. | 165/80.3 |
| 6,749,011 B1 | * | 6/2004 | Horng et al. | 165/80.3 |
| 2003/0024687 A1 | * | 2/2003 | Cheng et al. | 165/80.3 |
| 2003/0094273 A1 | * | 5/2003 | Toth et al. | 165/183 |
| 2004/0182552 A1 | * | 9/2004 | Kubo | 165/104.33 |
| 2004/0200608 A1 | * | 10/2004 | Baldassarre | 165/181 |

FOREIGN PATENT DOCUMENTS

| | | | | |
|---|---|---|---|---|
| JP | 11-54680 | * | 2/1999 | 165/104.33 |
| JP | 2003-283226 | * | 10/2003 | 165/104.33 |

* cited by examiner

*Primary Examiner*—Terrell McKinnon

(57) ABSTRACT

A cooling assembly is disclosed comprising one or more heat pipes heat pipes connected to a base member, a plurality of thermal plates connected to the one or more heat pipes at predefined intervals, wherein the one or more heat pipes intersects the plurality of thermal plates, and an opening fashioned in each one of the plurality of thermal plates.

9 Claims, 4 Drawing Sheets

SYSTEM AND METHOD FOR COOLING ELECTRONIC ASSEMBLIES

BACKGROUND

As technology has progressed allowing smaller and faster electronic components, the designs of electronic equipment have included more densely populated systems of such faster and smaller components. Increased speed has lead to increased heat generated by the electronics. Moreover, because the equipment is typically packed densely into smaller containers, the close proximity of each component exacerbates the heat being generated by the electronics. Because electronics are subject to heat damage, it becomes desirable to dissipate that heat to protect the underlying electronics.

SUMMARY

Representative embodiments of the present invention are directed to a heat sink comprising one or more heat pipes connected to a base member, a plurality of thermal plates connected to the one or more heat pipes at predefined intervals, wherein the one or more heat pipes intersects the plurality of thermal plates, and an opening fashioned in each one of the plurality of thermal plates.

Additional representative embodiments of the present invention are directed to a method of cooling an electronic assembly comprising conducting heat from the electronic assembly into a plurality of heat pipes extending from a conductive plate connected to the electronic assembly, conducting heat from the plurality of heat pipes to a set of thermal fins connected at predetermined intervals along the plurality of heat pipes, and exchanging heat from the plurality of heat pipes and the set of thermal fins to air flowing in a direction across the set of thermal fins, and a direction through an aperture in each one of the set of thermal fins.

Further representative embodiments of the present invention are directed to a system for dissipating heat generated in an electronic assembly comprising means for moving heat from the electronic assembly to a plurality of conductive columns extending perpendicularly from a base plate in contact with the electronic assembly, means for moving heat from the plurality of conductive columns to one or more thermal plates connected at predetermined distances along the plurality of conductive columns, wherein each one of the one or more thermal plates has an orifice there through, and means for transferring heat from the plurality of conductive columns and the one or more thermal plates to air flowing in a direction perpendicular to the one or more thermal plates, and a direction parallel to the one or more thermal plates.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
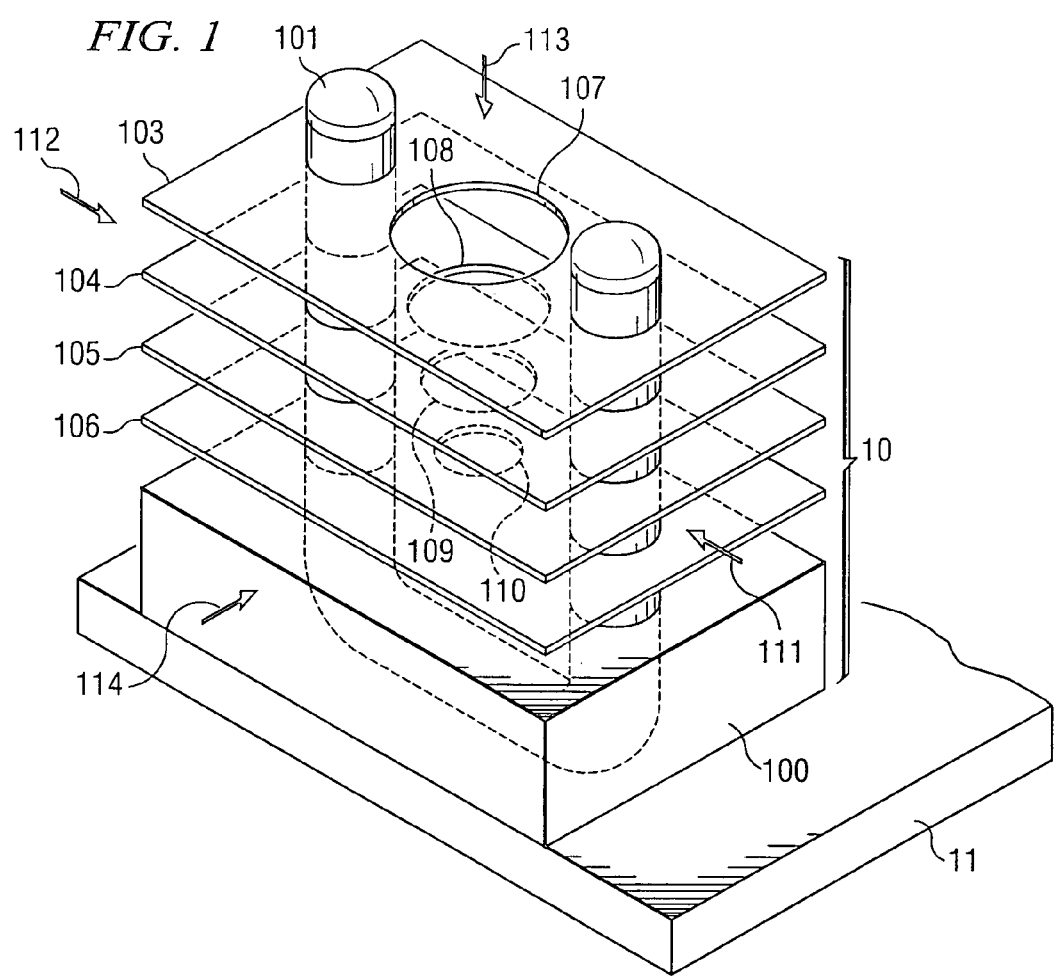
FIG. 1 is a perspective drawing illustrating one embodiment of a multi-direction cooling assembly.

FIG. 1 is a perspective drawing illustrating one embodiment of multi-direction cooling assembly 10. Multi-direction cooling assembly 10 is shown mounted on to circuit board 11. The function of multi-direction cooling assembly 10 is to cool or dissipate the heat generated from circuit board 11. Multi-direction cooling assembly 10 comprises a conductive plate, such as base plate 100. In some embodiments, base plate 100 may be made from copper, because of copper's high rate of thermal conductivity. Other embodiments may use materials with similar high thermal conductivity. Heat pipe 101 is a 'U'-shaped pipe anchored in base plate 100 extending upwards. Heat pipes are well-known in the art as a very efficient heat conductor. A typical heat pipe consists of a vessel in which its inner walls are usually lined with a wicking structure. The vessel may be constructed from copper, aluminum, or other such high thermal conductive material. The vessel is typically first vacuumed and then charged with a working fluid. The resulting structure is then generally hermetically sealed. When a heat pipe is heated at one end, the working fluid typically evaporates from liquid to vapor. The vapor generally travels through the hollow core to the other end of the heat pipe at near sonic speed, where heat energy is usually being removed by a heat sink or other means. The vapor typically condenses back to liquid at the other end which usually releases heat at the same time. The liquid then typically travels back to the original end via capillary action in the wicking structure. In operation, the working fluid in a heat pipe can usually transport a very large amount of heat and makes heat pipes much better heat conductors than a solid copper rod.

Thermal fins, such as thermal fins 103–106 may be used in such cooling assemblies. Thermal fins are well known in the art as generally thin, flat pieces of conductive metal, such as aluminum, that are typically used in heat sinks to increase the surface area of the heat dissipating elements. Thermal fins 103–106 are arranged around heat pipe 101 and also extend upwards from base plate 100. Each of thermal fins 103–106 may include a plate with a hole in it. Holes 107–110 are configured such that hole 107 in thermal fin 103 is larger than hole 108 in thermal fin 104, which is larger than hole 109 in thermal fin 105, and so forth. Thus, holes 107–110 are implemented in a descending diameter configuration.

In operation, multi-direction cooling assembly 10 allows heat to be dissipated or exchanged from circuit board 11 by thermal conduction and air flow in any of directions 111–114. As air flows along directions 111, 112, and 114 thermal fins 103–106, which have generally been heated by the heat generated from circuit board 11 and conducted through base plate 100, heat pipe 101, and air conduction, begin exchanging heat to the air flowing in directions 111, 112, and 114. In exchanging this heat with this cross airflow, thermal fins 103–106 are cooled, thus cooling the entire assembly. The embodiment of multi-direction cooling assembly 10 depicted in FIG. 1 is generally used in passive cooling implementations, in which the air flow typically comes from cross directions 111, 112, and 114.

Figure 2:
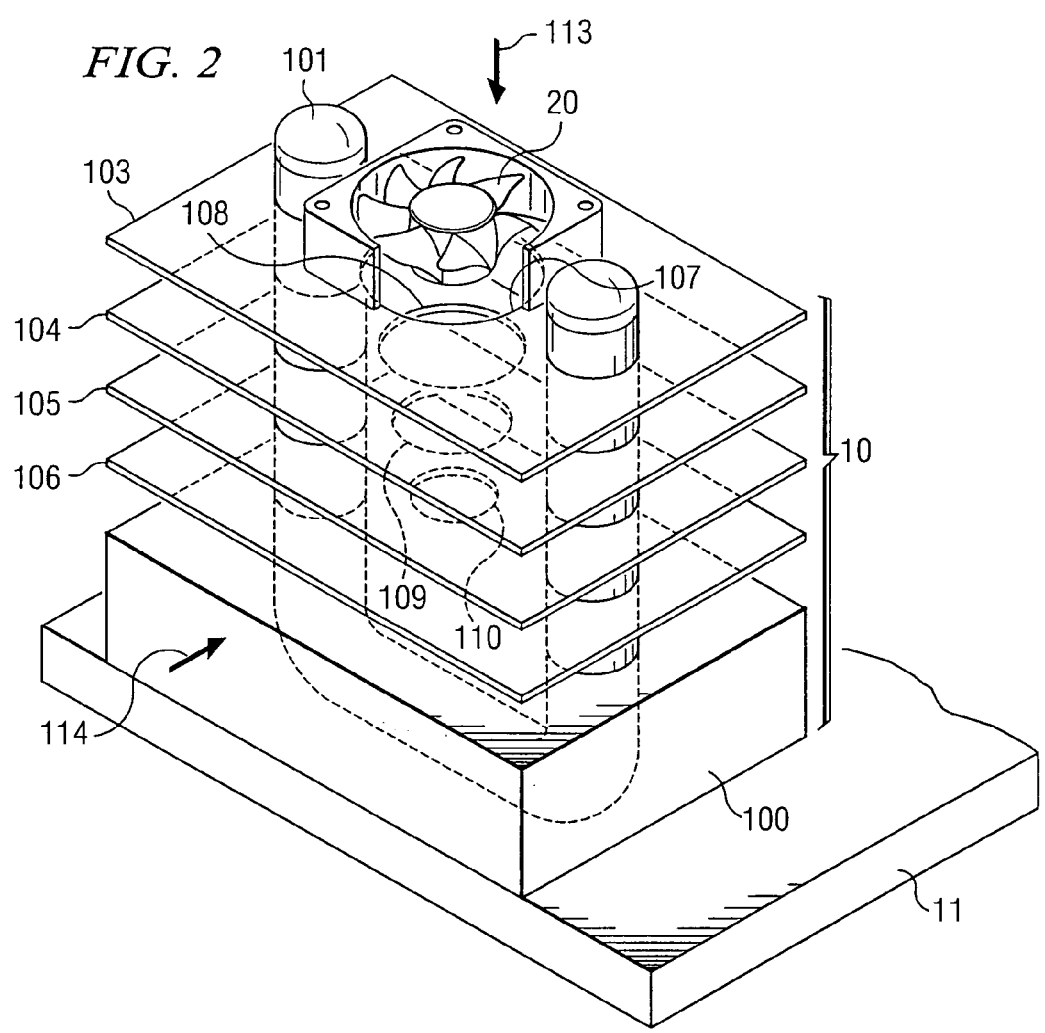
FIG. 2 is a perspective drawing illustrating another embodiment of a multi-direction cooling assembly.

FIG. 2 is a perspective drawing illustrating another embodiment of multi-direction cooling assembly 10. By adding fan 20 to multi-direction cooling assembly 10, multi-direction cooling assembly 10 becomes an active cooling device. Fan 20 directs air through multi-direction cooling assembly 10 in direction 113. By forcing air in direction 113, the cooling or heat dissipating capability of multi-direction cooling assembly 10 is increased. It should be noted that the configuration of multi-direction cooling assembly 10 did not change in moving from a passive cooling device to an active cooling device. The addition of the fan allows multi-direction cooling assembly 10 to become an active cooling device without changes to the structure of multi-direction cooling assembly 10.

In additional embodiments, any variations on the assembly of multi-direction cooling assembly 10 may be made. For example, holes 107–110 may be the same diameter. Moreover, instead of incorporating only two heat pipes, additional heat pipes may be added in relation to the size of the entire assembly. An additional variation that could be made is in the shape of thermal fins 103–106. While they are depicted as rectangles in FIGS. 1 and 2, any shape that includes a relatively large surface area may be used, such as circular, flat, wavy, notched, and the like.

Figure 3:
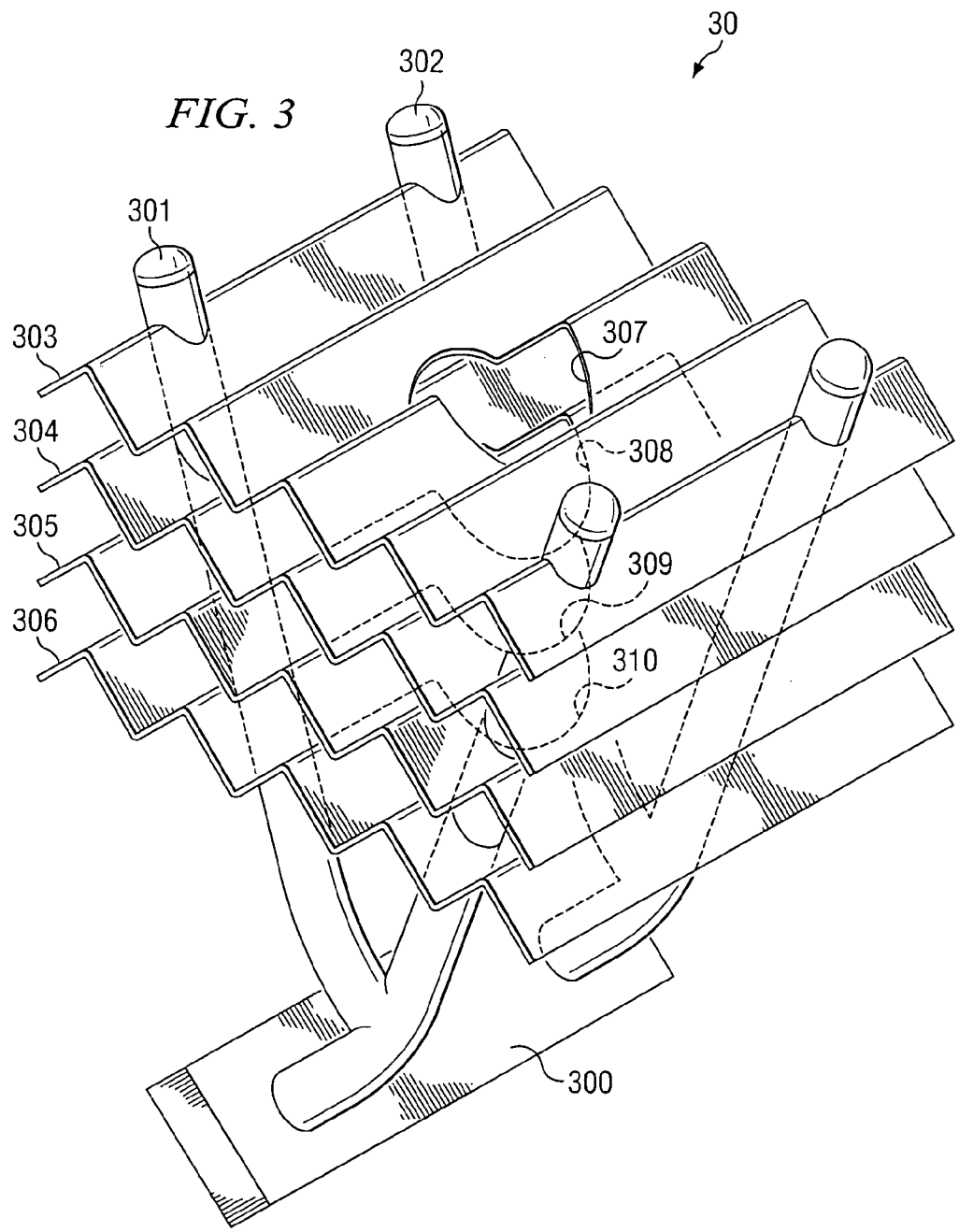
FIG. 3 is a perspective drawing illustrating a further embodiment of a multi-direction cooling assembly.

FIG. 3 is a perspective drawing illustrating a further embodiment of a multi-direction cooling assembly. Heat sink 30 is similar in nature to the cooling assembly depicted in FIGS. 1 and 2; however, heat sink 30 includes several alternative features. Heat sink 30 includes heat pipes 301–302, thermal fins 303–306, and conducting plate 300. Thermal fins 303–306 also include hexagonal apertures or orifices 307–310 having the same diameter allowing air to flow down through each level of thermal fins 303–306, which may also increase the area that air may flow. Thermal fins 303–306 are also implemented as wavy fins, instead of the flat shape illustrated in FIGS. 1 AND 2, which, while maintaining the overall footprint of the fin, increases the surface area to improve heat dissipation.

Figure 4:
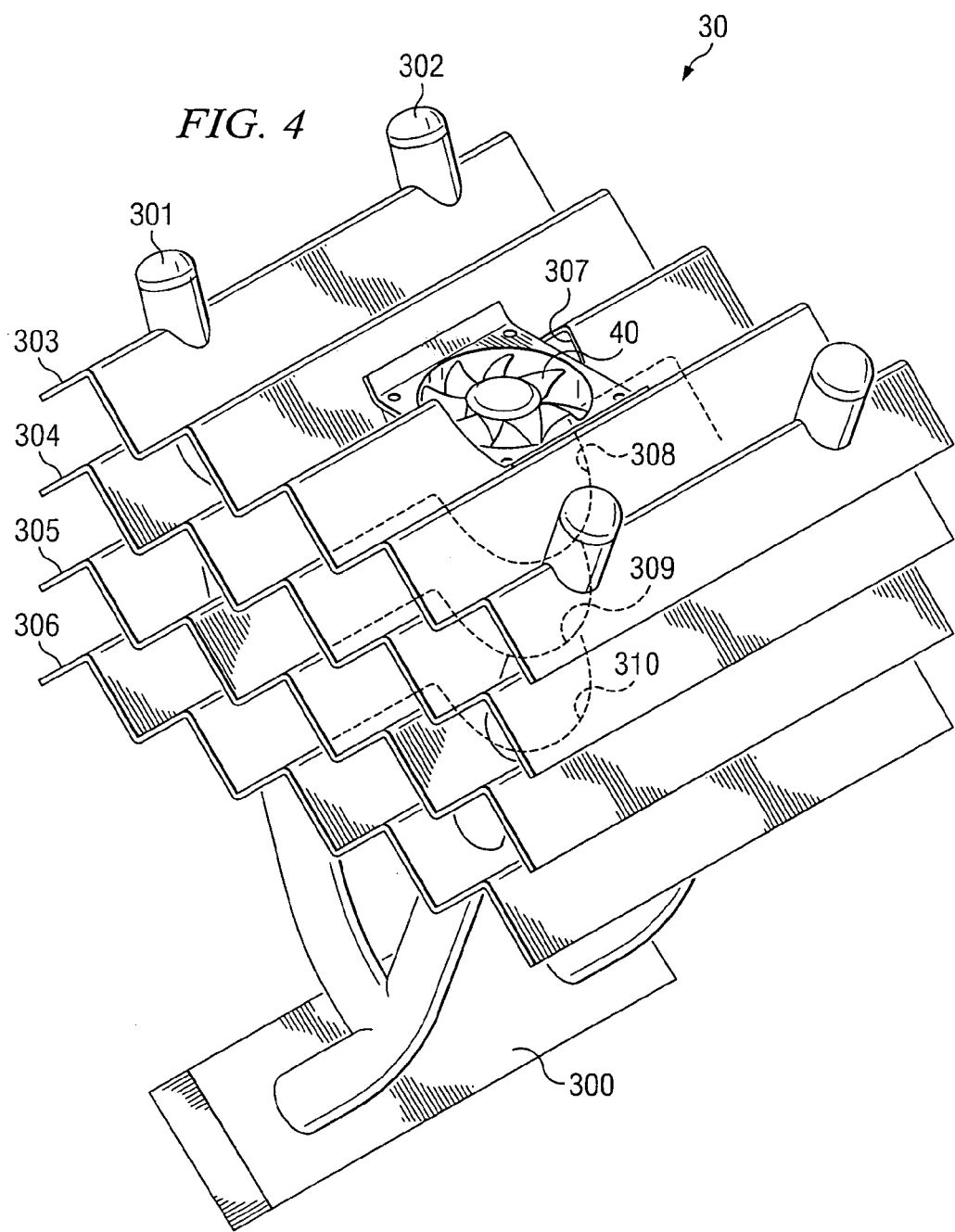
FIG. 4 is a perspective drawing illustrating a further embodiment of a multi-direction cooling assembly.

FIG. 4 is a perspective drawing illustrating a further embodiment of a multi-direction cooling assembly. The embodiment shown in FIG. 4 has been changed with the addition of fan assembly 40. By adding fan assembly 40, the passive cooling system shown in FIG. 3, has been converted into an active cooling device with necessity of changing the geometry of heat sink 30.

What is claimed is:

1. A heat sink comprising:
   one or more heat pipes connected to a base member;
   a plurality of thermal plates connected to said one or more heat pipes at predefined intervals, wherein said one or more heat pipes intersects said plurality of thermal plates; and
   an opening fashioned in each one of said plurality of thermal plates, wherein said opening allows airflow through said each one of said plurality of thermal plates in a direction perpendicular to said plurality of thermal plates wherein each of said openings are created having a decreasing size beginning with one of said plurality of thermal plates furthest from said base member.

2. The heat sink of claim 1 further comprising:
   a fan mounted in relation to said heat sink wherein said fan manipulates airflow down through each of said openings.

3. The heat sink of claim 1 wherein said one or more heat sinks and said plurality of thermal plates are constructed from a material having high thermal conductivity.

4. A method of cooling an electronic assembly comprising:
   conducting heat from said electronic assembly into a plurality of heat pipes extending from a conductive plate connected to said electronic assembly;
   conducting heat from said plurality of heat pipes to a set of thermal fins connected at predetermined intervals along said plurality of heat pipes; and
   exchanging heat from said plurality of heat pipes and said set of thermal fins to air flowing in:
      a direction across said set of thermal fins; and
      a direction through an aperture in each one of said set of thermal fins
      wherein said aperture for each fin is fashioned having a decreasing size.

5. The method of claim 4 further comprising: pushing air in a direction orthogonal to said set of thermal fins.

6. The method of claim 4 further comprising: pushing air in a direction parallel to said set of thermal fins.

7. A system for dissipating heat generated in an electronic assembly comprising:
   means for moving heat from said electronic assembly to a plurality of conductive columns extending perpendicularly from a base plate in contact with said electronic assembly;
   means for moving heat from said plurality of conductive columns to one or more thermal plates connected at predetermined distances along said plurality of conductive columns, wherein each one of said one or more thermal plates has an orifice there through, wherein said orifice is fashioned having a decreasing area for each successive plate; and
   means for transferring heat from said plurality of conductive columns and said one or more thermal plates to air flowing in:
      a direction perpendicular to said one or more thermal plates; and
      a direction parallel to said one or more thermal plates.

8. The system of claim 7 further comprising:
   means for fanning air in a direction perpendicular to said one or more thermal plates, wherein said air flows through said orifice.

9. The system of claim 7 further comprising:
   means for fanning air in a direction parallel to said one or more thermal plates.

* * * * *